US 8,228,841 B2

(12) United States Patent
Jung et al.

(10) Patent No.: US 8,228,841 B2
(45) Date of Patent: Jul. 24, 2012

(54) METHOD AND SYSTEM FOR TRANSMITTING RESOURCE ALLOCATION INFORMATION IN A COMMUNICATION SYSTEM

(75) Inventors: Young-Ho Jung, Suwon-si (KR); Yung-Soo Kim, Seongnam-si (KR); Cheol-Woo You, Seoul (KR); Sung-Hyun Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1255 days.

(21) Appl. No.: 11/848,619

(22) Filed: Aug. 31, 2007

(65) Prior Publication Data

US 2009/0059850 A1 Mar. 5, 2009

(30) Foreign Application Priority Data

Aug. 31, 2006 (KR) .................. 10-2006-0083462

(51) Int. Cl.
*H04W 4/00* (2009.01)
(52) U.S. Cl. ...................................... 370/328
(58) Field of Classification Search .............. 370/315, 370/331, 332, 310, 329, 310.2, 351, 230, 370/312, 328, 338, 349, 431
See application file for complete search history.

(56) References Cited

U.S. PATENT DOCUMENTS

| 7,519,045 | B2* | 4/2009 | Kim et al. ............... 370/351 |
| 7,542,439 | B2* | 6/2009 | Rubin ..................... 370/315 |
| 7,813,695 | B2* | 10/2010 | Haartsen ................ 455/11.1 |
| 8,018,893 | B2* | 9/2011 | Sartori et al. ............ 370/329 |
| 2007/0081483 | A1 | 4/2007 | Jang et al. |
| 2007/0097945 | A1* | 5/2007 | Wang et al. .............. 370/349 |
| 2007/0286127 | A1* | 12/2007 | Inohiza ................... 370/331 |
| 2008/0043817 | A1* | 2/2008 | Beems Hart et al. ...... 375/135 |
| 2010/0046413 | A1* | 2/2010 | Jin et al. .................. 370/315 |

FOREIGN PATENT DOCUMENTS

| KR | 1020070035869 | 4/2007 |
| KR | 1020070062757 | 6/2007 |
| KR | 1020070080367 | 8/2007 |
| KR | 1020070117140 | 12/2007 |

* cited by examiner

*Primary Examiner* — Kwang B Yao
*Assistant Examiner* — Anh Ngoc Nguyen
(74) *Attorney, Agent, or Firm* — The Farrell Law Firm, P.C.

(57) ABSTRACT

A method and system for transmitting and receiving resource allocation information in a communication system are disclosed, in which an Relay Station (RS) receives a resource allocation information message from a Base Station (BS), detects a first resource allocation information from the resource allocation information message, and detects a second resource allocation information intended only for the RS using the first resource allocation information.

27 Claims, 8 Drawing Sheets

| Preamble | BCH | MAP for relay 2 | direct | direct | RS 2 |
| | MAP for relay 1 | | RS 2 | RS 1 | RS1 and RS2 |
| | | | | RS1 and RS2 | RS 1 |
| | | | RS1 and RS2 | | |
| | | | RS 1 | direct | RS 2 |
| | MAP for no relay | MAP for relay 1 and 2 | RS 2 | RS 1 | direct |
| | | | RS1 and RS2 | RS 1 | RS 2 |

METHOD AND SYSTEM FOR TRANSMITTING RESOURCE ALLOCATION INFORMATION IN A COMMUNICATION SYSTEM

PRIORITY

This application claims priority under 35 U.S.C. §119(a) to a Korean Patent Application filed in the Korean Intellectual Property Office on Aug. 31, 2006 and assigned Serial No. 2006-83462, the contents of which are incorporated herein by reference.

BACKGROUND OF THE INVENTION

1. Field of the Invention

The present invention generally relates to a communication system, and in particular, to a method and system for transmitting resource allocation information in a multi-hop communication system.

2. Description of the Related Art

Provisioning of high-speed large-data transmission/reception services to Mobile Stations (MSs) is an active study area for future-generation communication systems. Particularly, use of a multi-hop scheme to increase system capacity is under serious consideration. A multi-hop communication system will be described in terms of increasing system capacity.

In the multi-hop communication system, if the channel status between a Base Station (BS) and an MS is bad, a Relay Station (RS) positioned between the BS and the MS relays signals between them. As the MS transmits and receives signals on the better one between channels provided by the BS and the RS, its capacity is increased, thereby increasing system capacity.

If two RSs exist between the BS and the MS, the BS selects an RS for signal relaying and transmits control information for the selected RS and the MS. The control information is carried in a resource allocation information message such as a DownLink-MAP (DL-MAP) or an UpLink-MAP (UL-MAP).

In general, the BS transmits to RSs a resource allocation information message without information about the selected RS. Upon receipt of the resource allocation information message, the RSs decode the message, thus acquiring control information needed for data decoding, including channel coding schemes, coding rates, and modulation schemes of entire data resources.

The RSs decode entire data bursts based on the whole decoded resource allocation information message and re-encode the resource allocation information message and the data bursts. The RSs then transmit the re-encoded resource allocation information message and the entire encoded data bursts to the MS. The MS acquires resource allocation information by decoding the resource allocation information message and recovers data intended for the MS using information about data resources allocated to the MS included in the resource allocation information.

As described above, the conventional resource allocation information message does not include RS information. Accordingly, upon receipt of the resource allocation information message, an RS decodes both the resource allocation information message and data, re-encodes them, and transmits the re-encoded resource allocation information message and data to an MS. Since even data for which direct transmission between the BS and the MS is preferable in case of a bad channel connection between the selected RS and the MS is relayed through the RS after decoding, inter-cell interference increases, resulting in a decrease in performance. Moreover, the decoding of the whole resource allocation information message causes a time delay and increases power consumption.

SUMMARY OF THE INVENTION

An aspect of the present invention is to substantially solve at least the above problems and/or disadvantages and to provide at least the advantages described below. Accordingly, one aspect of the present invention is to provide a method and system for transmitting resource allocation information so as to minimize the size of a resource allocation information message in a communication system.

Another aspect of the present invention is to provide a method and system for transmitting resource allocation information so as to minimize a time delay in a communication system.

A further aspect of the present invention is to provide a method and system for transmitting resource allocation information so as to minimize the transmit power of an RS in a communication system.

According to one aspect of the present invention, there is provided a method and system for transmitting and receiving resource allocation information in an Relay Station (RS) in a communication system. The method includes receiving a resource allocation information message from a BS; detecting a first resource allocation information from the resource allocation information message; and detecting a second resource allocation information intended only for the RS using the first resource allocation information.

According to another aspect of the present invention, there is provided a method for transmitting resource allocation information in a Base Station (BS) in a communication system. The method includes a BS selecting a Relay Station (RS) for relaying a signal between the BS and an Mobile Station (MS); generating a first resource allocation information including information about the position, channel coding rate, and modulation scheme of the resource allocation information intended for the selected RS; generating a second resource allocation information including information about the position and size of a data burst to be relayed by the selected RS; generating a resource allocation information message including the first and second resource allocation information; and transmitting the resource allocation information message to the selected RS.

According to yet another aspect of the present invention, there is provided a system for transmitting and receiving resource allocation information in a communication system, which has a Mobile Station (MS) and a Relay Station (RS) for relaying a signal between the MS and a Base Station (BS). The system includes the RS receiving a resource allocation information message from the BS; detecting a first resource allocation information from the resource allocation information message; and detecting a second resource allocation information intended only for the RS using the first resource allocation information.

According to still another aspect of the present invention, there is provided a system for transmitting and receiving resource allocation information in a communication system, which has a Mobile Station (MS) and a Relay Station (RS) for relaying a signal between the MS and a Base Station (BS). The system includes the BS selecting the RS for relaying a signal between the BS and the MS; generating a first resource allocation information including information about the position, channel coding rate, and modulation scheme of the resource allocation information intended for the selected RS; generating a second resource allocation information including information about the position and size of a data burst to be relayed by the selected RS; generating a resource allocation information message including the first and second resource allocation information; and transmitting the resource allocation information message to the selected RS.

According to still further another aspect of the present invention, there is provided a method for transmitting and receiving resource allocation information in a Relay Station (RS) in a communication system. The method includes the RS receiving a downlink data frame from a Base Station (BS); the downlink data frame including information about a second area in a first area, decoding the second area using the second area information; detecting a third area including a data burst to be relayed by the RS according to the decoded second area detecting the data burst by decoding the third area; and encoding information acquired by decoding the first, second, and third areas and the detected data burst and relaying the encoded information and data burst to a Mobile Station (MS).

According to yet another aspect of the present invention, there is provided a method for transmitting and receiving resource allocation information in an Relay Station (RS) in a communication system. The method includes the RS receiving a resource allocation information message from a Base Station (BS); acquiring information about an RS to relay a signal between the BS and a Mobile Station (MS) and information about a data burst to be relayed by the RS by decoding the resource allocation information message; encoding the resource allocation information message and transmitting the encoded resource allocation information message to the MS.

According to yet another further aspect of the present invention, there is provided a method for transmitting resource allocation information in a BS in a communication system, in which the Base Station (BS) selects a Relay Station (RS) to relay a signal between the BS and a Mobile Station (MS), generates RS information for the selected RS, generates a resource allocation information message including the RS information and information about a data burst to be relayed by the RS, and transmits the resource allocation information message to the RS.

According to still another aspect of the present invention, there is provided a system for transmitting and receiving resource allocation information in a communication system, which has a Mobile Station (MS) and a Relay Station (RS) for relaying a signal between a Base Station (BS) and the MS, wherein the RS receives a resource allocation information message from the BS, acquires information about an RS to relay a signal between the BS and the MS and information about a data burst to be relayed by decoding the resource allocation information message, encodes the resource allocation information message, and transmits the encoded resource allocation information message to the MS.

According to yet another aspect of the present invention, there is provided a system for transmitting and receiving resource allocation information in a communication system, which has a Mobile Station (MS) and a Relay Station (RS) for relaying a signal between a Base Station (BS) and the MS. The system includes the BS selecting the RS for relaying a signal between the BS and the MS; generating an RS information for the selected RS, generates a resource allocation information message including the RS information and information about a data burst to be relayed by the RS, and transmits the resource allocation information message to the RS.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method and system for configuring and transmitting a resource allocation information message with explicit information about a selected Relay Station (RS) that will relay signals between a Base Station (BS) and a Mobile Station (MS) by the BS in a communication system. Thus, the RS acquires information about the position and size of a data burst to be relayed by the RS by decoding only resource allocation information intended for the RS.

While the present invention will be described under the assumption that two RSs are positioned between a BS and an RS, it is to be clearly understood that the present invention is also applicable for more RSs.

Before describing FIG. 1, a frame structure according to the present invention is described below.

A frame includes a preamble area, a resource allocation information area, and a data burst area. The preamble area delivers a preamble by which the MSs and RSs acquire synchronization to a BS before signal transmission/reception. The resource allocation information area provides resource allocation information including RS information for individual data bursts according to the present invention, in addition to common information and control information. The RS information is identification information that identifies the RSs for decoding, re-encoding and relaying data bursts allocated to them. The data burst area includes data bursts which the RSs will relay to the MSs. In this case, the RSs can be the MSs.

Figure 1:
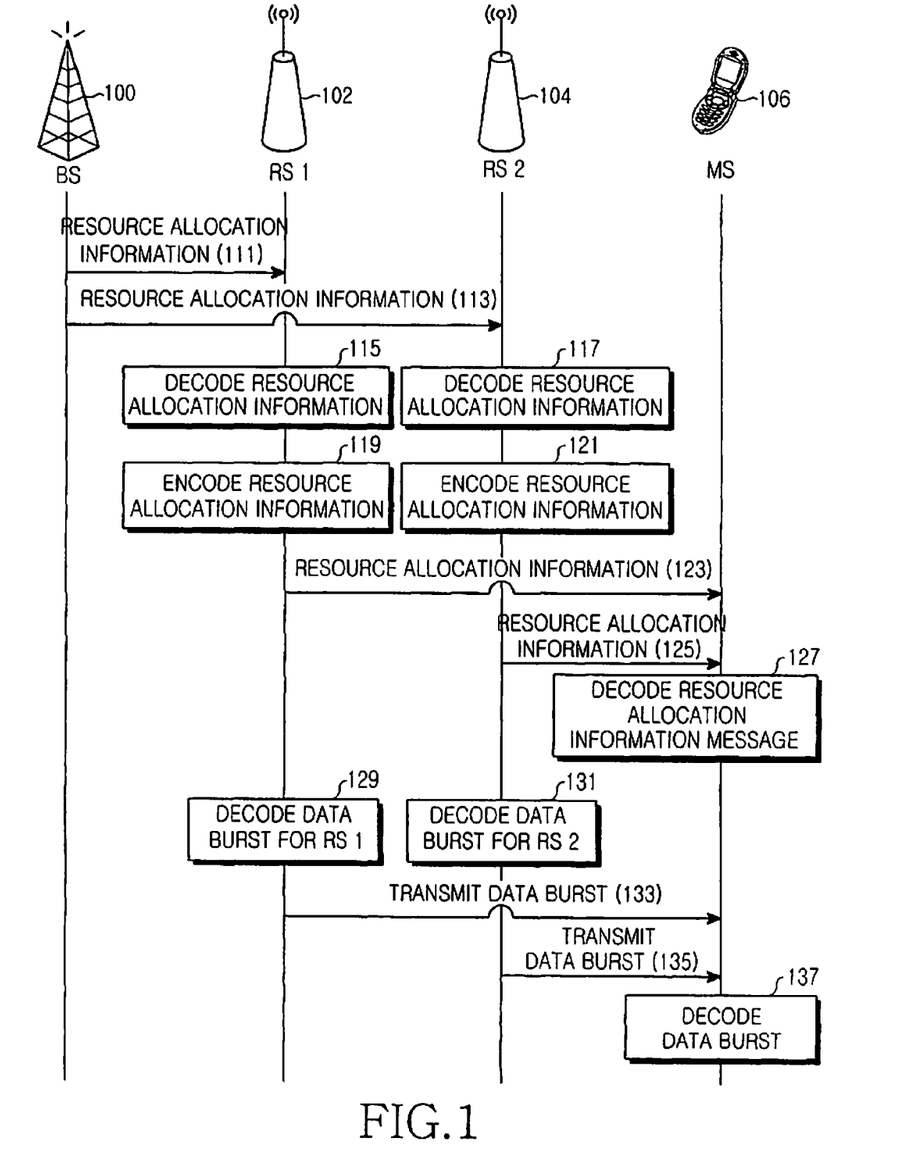
FIG. 1 is a diagram illustrating a signal flow for a procedure for transmitting/receiving a resource allocation information message according to an exemplary embodiment of the present invention.

FIG. 1 is a diagram illustrating a signal flow for a process for transmitting/receiving a resource allocation information message according to the present invention.

A resource allocation information message carries information about RSs that will relay signals between a BS and MSs with respect to individual data bursts. An RS acquires information about the RSs that will relay signals, together with resource allocation information by decoding the entire resource allocation information message. The RS then decodes a data burst for an MS that it will serve, re-encodes the entire resource allocation information message and the data burst, and transmits them to the MS.

In FIG. 1, a BS 100 transmits a resource allocation information message to a first RS 102 (RS 1) and a second RS 104 (RS 2) in steps 111 and 113. Upon receipt of the resource allocation information message, RS 1 and RS 2 decode entire resource allocation information in the resource allocation information message in steps 115 and 117. In steps 119 and 121, RS 1 and RS 2 thus acquire information about an RS that will relay signals between the BS 100 and an MS 106. RS 1 and RS 2 re-encode the entire resource allocation information message and transmit the re-encoded message to the MS 106 in steps 123 and 125. The MS 106 decodes the resource allocation information message in step 127.

If RS 1 is the RS that will relay signals between the BS 100 and the MS 106, RS 1 decodes a data burst allocated to it in the resource allocation information message in step 129. RS 1 then re-encodes the decoded data burst and transmits the re-encoded data burst to the MS 106 in step 133. The MS 106 decodes the data burst in step 137.

If RS 2 is the RS that will relay signals between the BS 100 and the MS 106, RS 2 decodes a data burst allocated to it in the resource allocation information message in step 131. RS 2 then re-encodes the decoded data burst and transmits the re-encoded data burst to the MS 106 in step 135. The MS 106 decodes the data burst in step 137.

Figure 2:
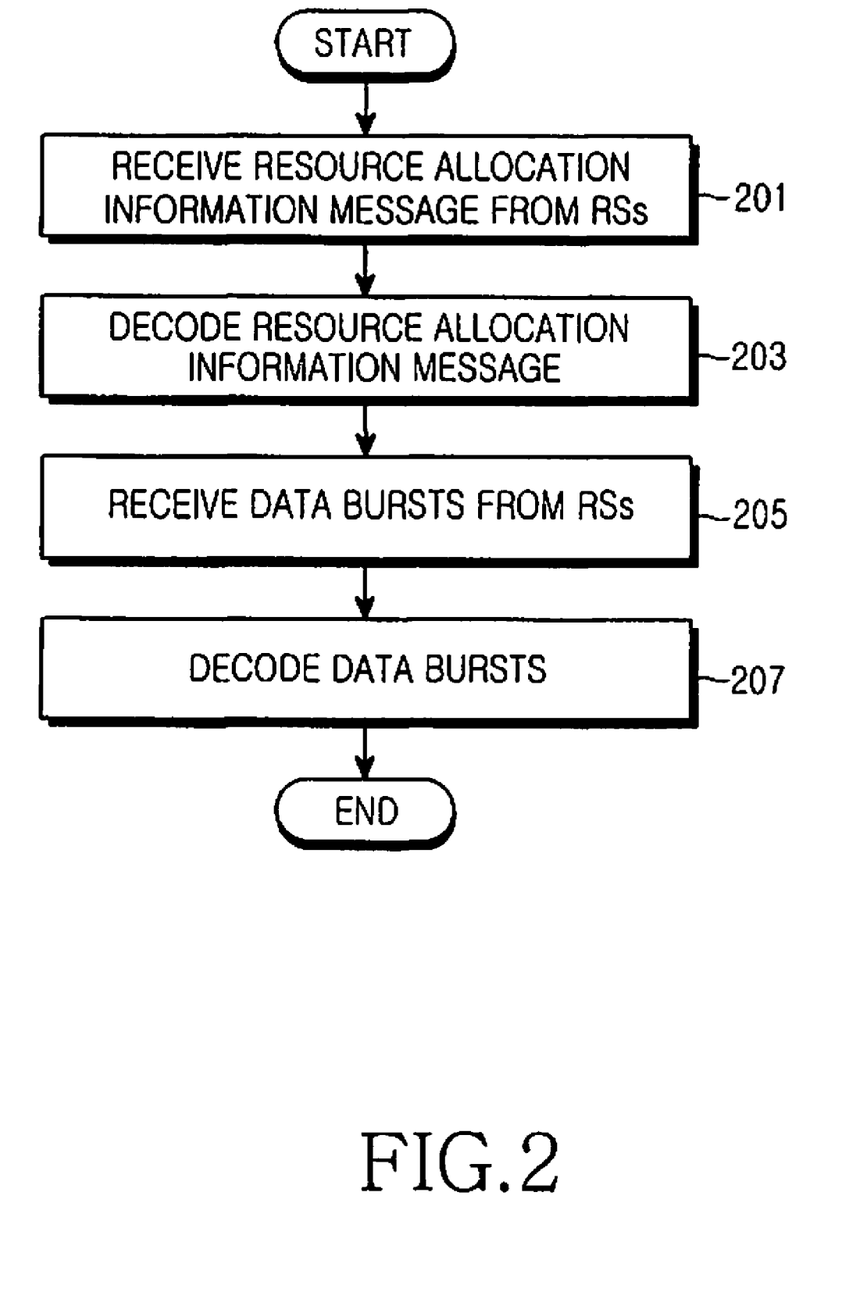
FIG. 2 is a flowchart illustrating a process of a Mobile Station (MS) according to the present invention.

FIG. 2 is a flowchart illustrating an operation of the MS according to an exemplary embodiment of the present invention.

In FIG. 2, the MS receives entire resource allocation information in a resource allocation information message from the RSs in step 201 and decodes them in step 203. The MS receives data bursts from the RSs in step 205 and decodes the data bursts in step 207. Then the MS ends the algorithm.

Figure 3:
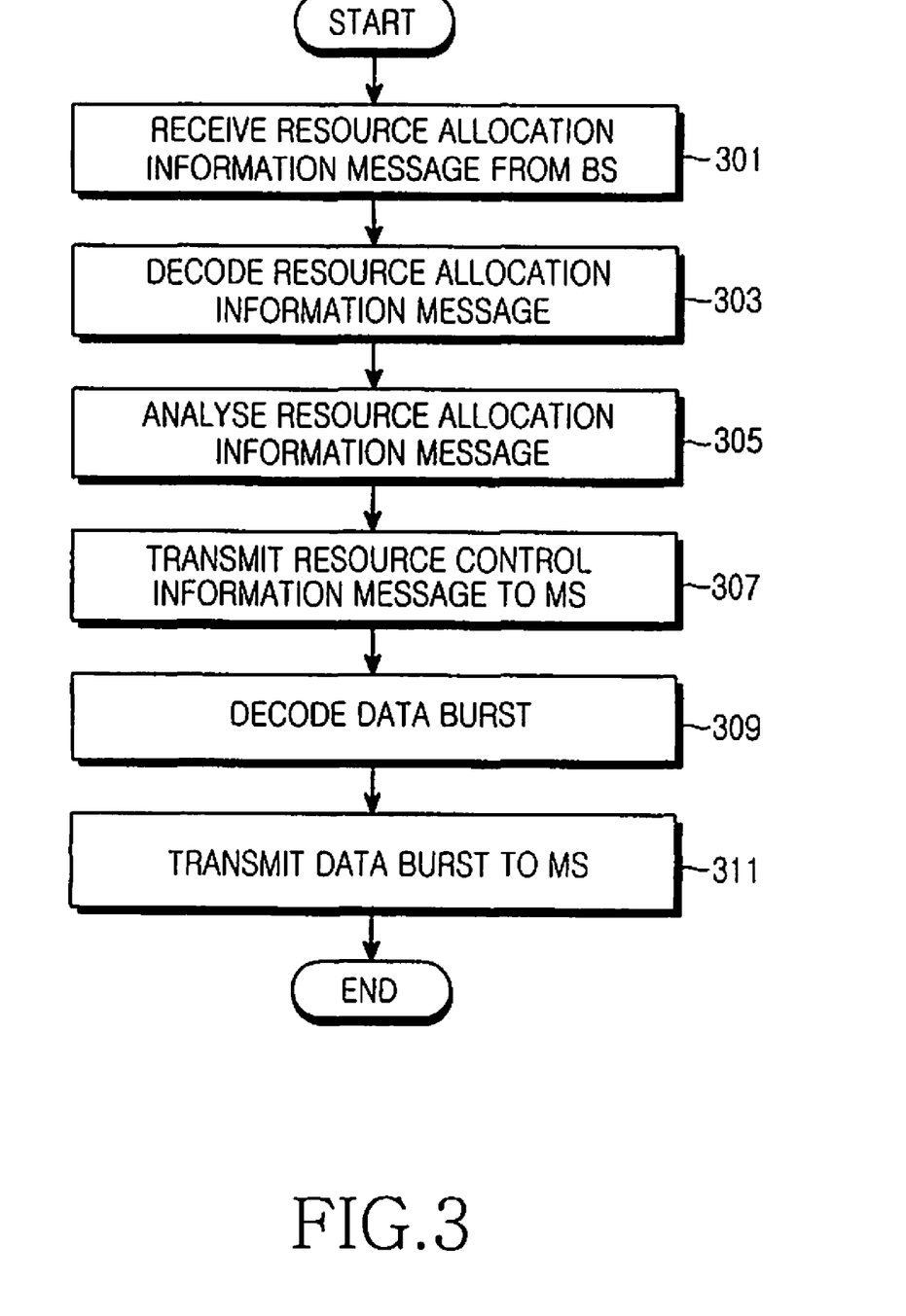
FIG. 3 is a flowchart illustrating a process of a Relay Station (RS) according to the present invention.

FIG. 3 is a flowchart illustrating an operation of the RSs according to an exemplary embodiment of the present invention.

In FIG. 3, each of the RSs receives a resource allocation information message from the BS in step 301 and decodes the entire resource allocation information message in step 303. After analyzing the decoded resource allocation information message in step 305, the RSs re-encodes and transmits the resource allocation message to the MS in step 307. In step 309, the RSs decodes an allocated data burst. The RSs then transmits the data burst to the MS in step 311 and ends the process.

According to the above-described embodiment, the RSs acquire information about a selected RS that will relay signals between a BS and an MS by decoding an entire resource allocation information message received from the BS. Here, as the BS inserts the RS information in the resource allocation information message, the RSs identify the selected RS from the RS information resulting from decoding the resource allocation information message. The selected RS can relay a signal by decoding only an allocated data burst.

However, in present invention the insertion of individual pieces of RS information for resources allocated to the individual RSs in a resource allocation information message increases the size of the resource allocation information message. As such, as each RS should decode the entire pieces of resource allocation information of the resource allocation information, computation volume and delay are typically realized.

In this context, another embodiment of the present invention provides a BS that transmits control information about the positions and transmission schemes of resource allocation information in a Broadcast Channel (BCH) of a downlink data frame.

Since each RS decodes only resource allocation information intended for the RS in a resource allocation information area, the decoding computation volume, time delay, and transmit power of the RS can be reduced. Also, a Modulation and Coding Scheme (MCS) is adapted to the channel status of each RS, thus decreasing the size of resource allocation information message.

Figure 4:
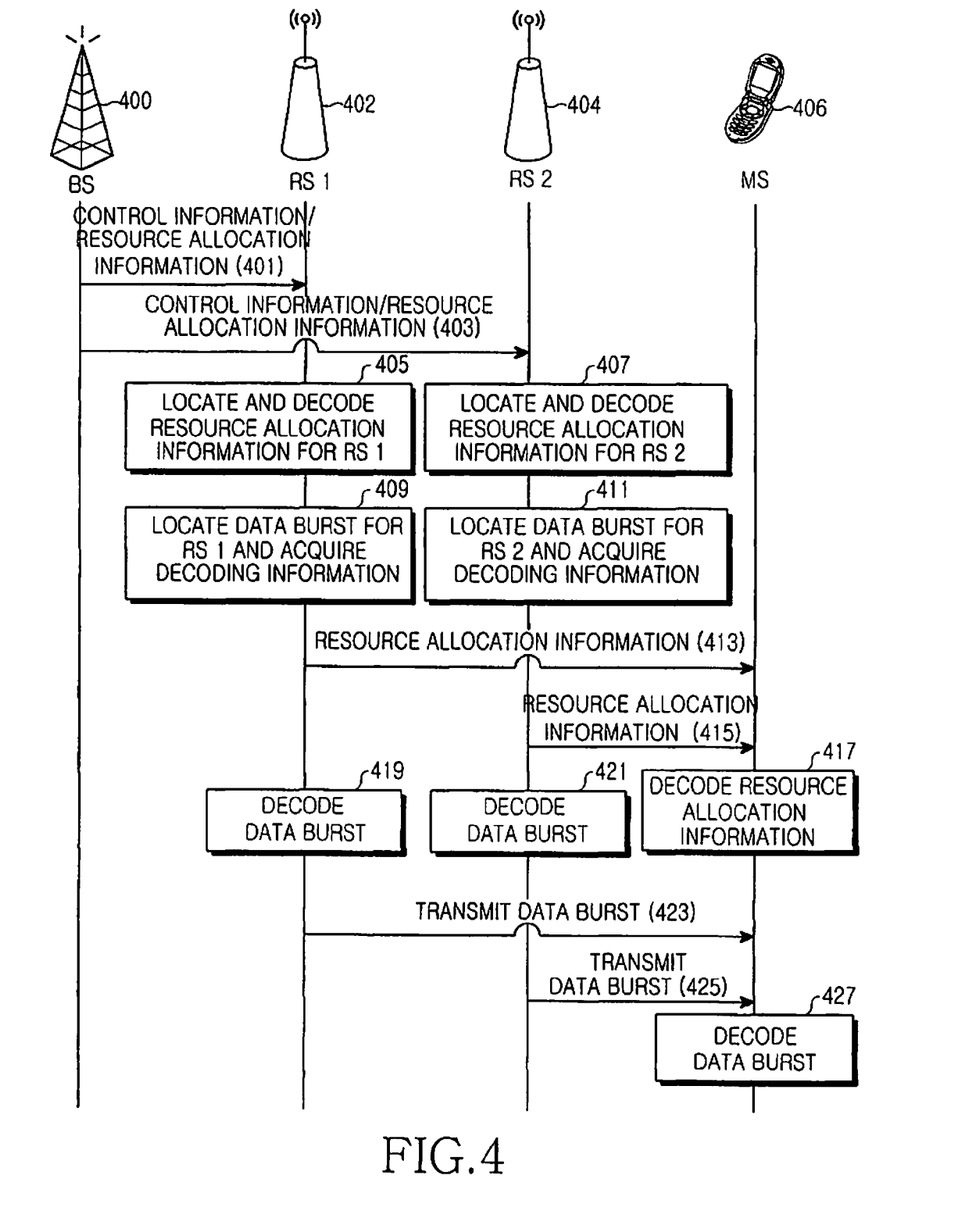
FIG. 4 is a diagram illustrating a signal flow of a process for transmitting/receiving a resource allocation information message according to the present invention.

FIG. 4 is a diagram illustrating a signal flow for a process for transmitting/receiving a resource allocation information message according to another embodiment of the present invention.

When a BS 400 transmits a resource allocation information message to a first RS 402 (RS 1) and a second RS 404 (RS 2), it includes control information indicating the positions of resource allocation information for individual RSs which will relay signals between the BS 400 and MSs in an BCH. If RS 1 and RS 2 are selected to relay signals between the BS 400 and an MS 406, the BS 400 sets resource allocation information separately for RS 1 and RS 2 in a resource allocation information area. Thus, in accordance with the second embodiment of the present invention, an RS acquires only resource allocation information set for the RS in the BCH.

In FIG. 4, the BS 400 transmits a resource allocation information message including control information and resource allocation information to RS 1 and RS 2 in steps 401 and 403. The control information carried in the BCH further includes information about the positions of the resource allocation information set for individual RSs to relay signals between the BS 400 and MSs and the coding rates and modulation schemes of the resource allocation information. Thus, RS 1 and RS 2 acquire information about the positions of their resource allocation information and information needed for decoding the resource allocation information from the control information in steps 405 and 407.

If the MS 406 is supposed to receive a signal from the BS 400 via RS 1, RS 1 then decodes the resource allocation information intended for RS 1. Thereafter, RS 1 acquires information about the position of a data burst allocated to RS 1 and information needed for decoding the data burst in step 409.

In step 413, RS 1 encodes the decoded resource allocation information and transmits the encoded resource allocation information to the MS 406. Also, RS 1 decodes the data burst, re-encodes the decoded data channel, and transmits the re-encoded data burst to the MS 406 in steps 419 and 423.

If the MS 406 is supposed to receive a signal from the BS 400 via RS 2, RS 2 then decodes the resource allocation information intended for RS 2. Thereafter, RS 2 acquires information about the position of a data burst allocated to RS 2 and information needed for decoding the data burst in step 411.

In step 415, RS 2 encodes the decoded resource allocation information and transmits the encoded resource allocation information to the MS 406. Also, RS 2 decodes the data burst, re-encodes the decoded data burst, and transmits the re-encoded data burst to the MS 406 in steps 421 and 425.

Upon receipt of the data bursts from RS 1 and RS 2, the MS 406 decodes the data bursts in step 427.

Figure 5:
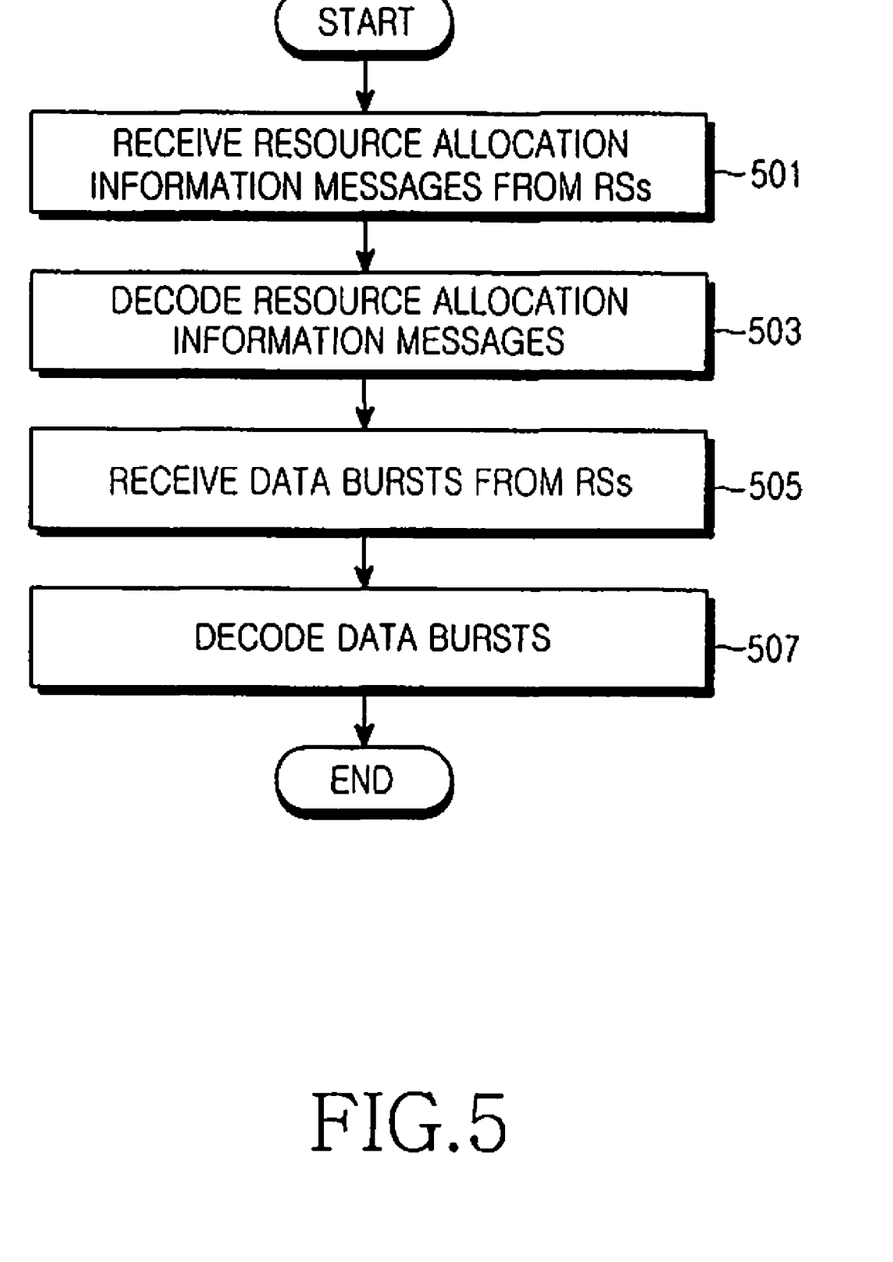
FIG. 5 is a flowchart illustrating a process of the MS according to the present invention.

FIG. 5 is a flowchart illustrating a process of the Mobile Station (MS) according to another embodiment of the present invention.

In FIG. 5, the MS receives a resource allocation information message from an RS in step 501 and decodes the resource allocation information message in step 503. The MS receives a data burst from the RS in step 505 and decodes the data burst in step 507. Then the MS ends the process.

Figure 6:
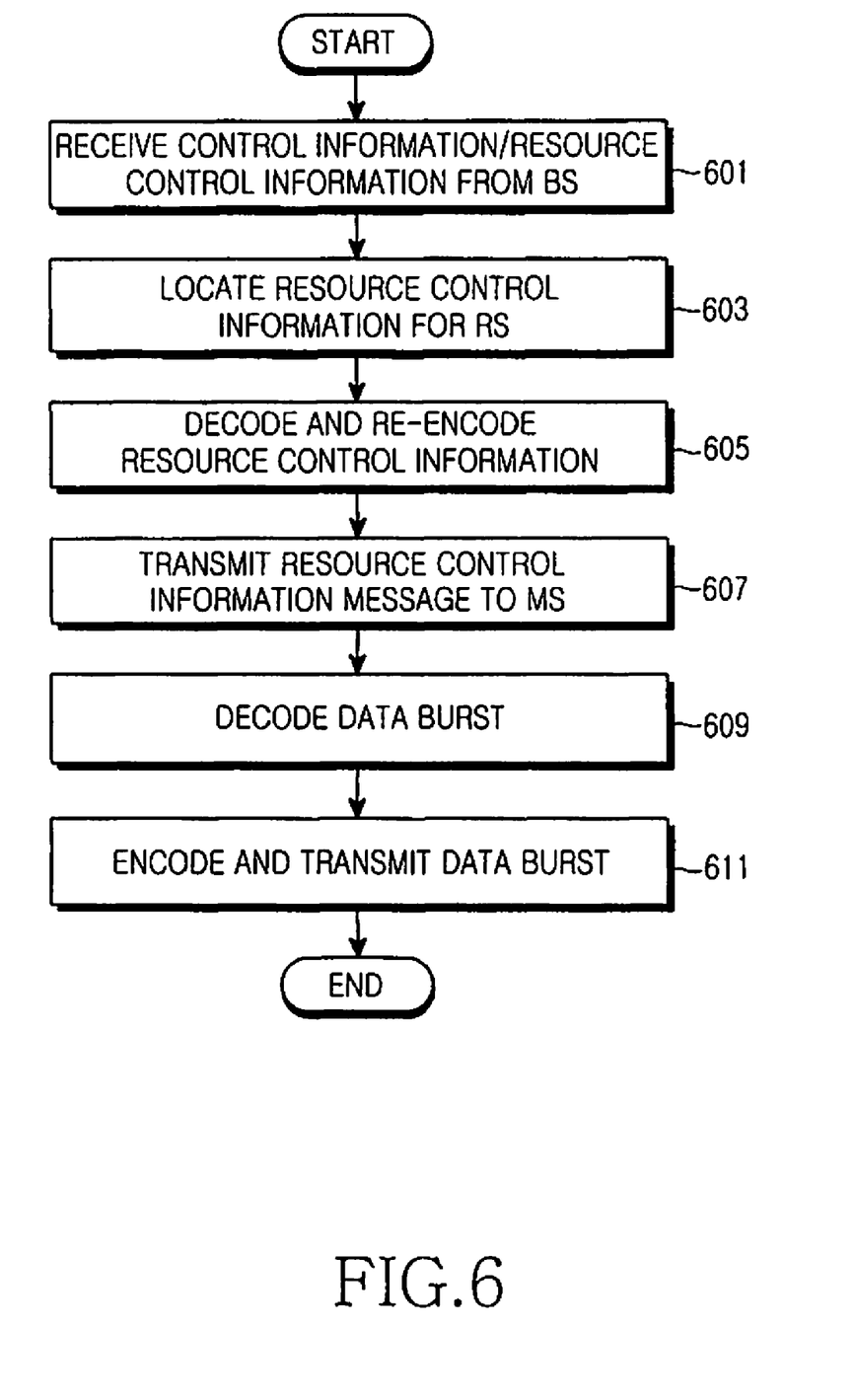
FIG. 6 is a flowchart illustrating a process of the RS according to the present invention.

FIG. 6 is a flowchart illustrating an operation of the Relay Station (RSs) according to another embodiment of the present invention.

In FIG. 6, each of the RSs receives a resource allocation information message from the BS in step 601 and identifies the positions of resource allocation information set for RSs to relay signals between the BS and MSs in control information included in the resource allocation information message in step 603. In step 605, the RSs decodes allocated resource allocation information and re-encodes the resource allocation information. The RS transmits the re-encoded resource allocation information to an MS in step 607. The RS also decodes a data burst to be relayed to the MS in step 609 and re-encodes the data burst and transmits it to the MS in step 611. The RS then ends the process.

Figure 7:
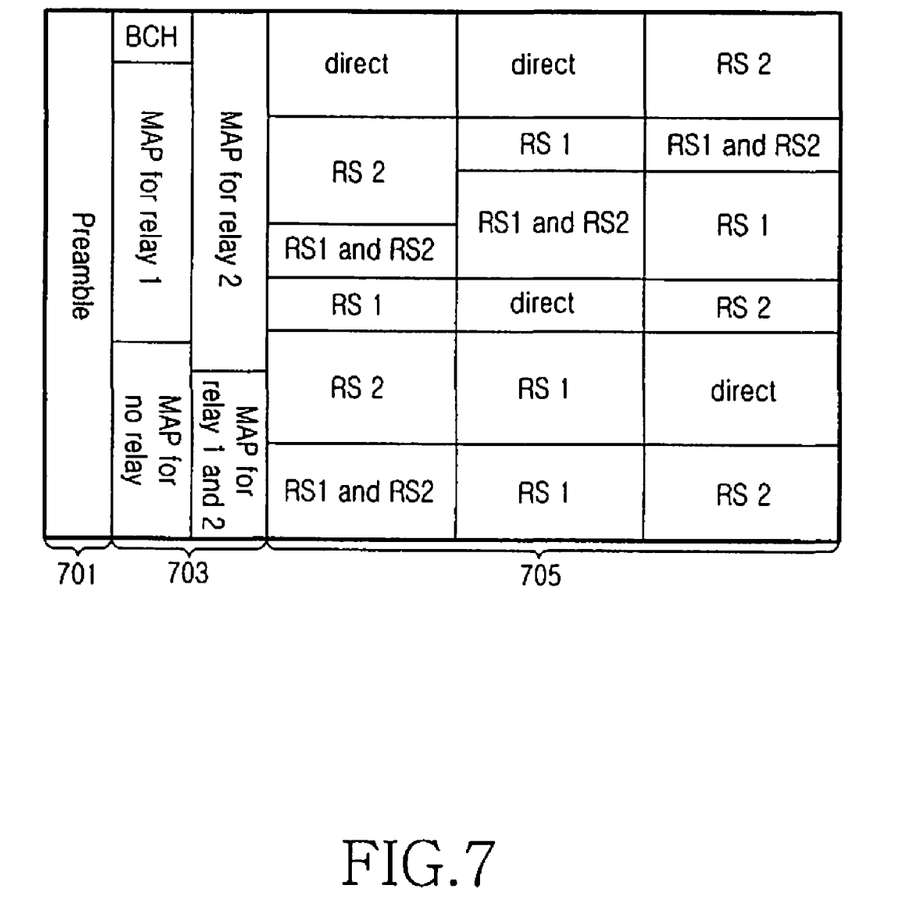
FIG. 7 illustrates a frame structure defined to implement the resource allocation information transmission scheme illustrated in FIG. 4.

FIG. 7 illustrates a frame structure defined to implement the resource allocation information transmission scheme according to the second embodiment of the present invention.

In FIG. 7, a frame includes a preamble area 701, a resource allocation information area 703, and a data burst area 705. The resource allocation information area 703 has control information Broadcast Channel (BCH), which indicates the positions, channel coding rates, and modulation schemes of resource allocation information set for the RSs that will relay signals. Upon receipt of a resource allocation information message from the BS 400, RS 1 and RS 2 get knowledge of the positions of the resource allocation information for the RSs to relay signals between the BS 400 and the MS 406.

If RS 1 is to relay signals between the BS 400 and the MS 406, RS 1 decodes resource allocation information allocated to RS 1 in the resource allocation information area and thus decodes a data burst indicated by the decoded resource allocation information in the data burst area.

If RS 2 is to relay signals between the BS 400 and the MS 406, RS 2 decodes resource allocation information allocated to RS 2 in the resource allocation information area and thus decodes a data burst indicated by the decoded resource allocation information in the data burst area.

Figure 8:
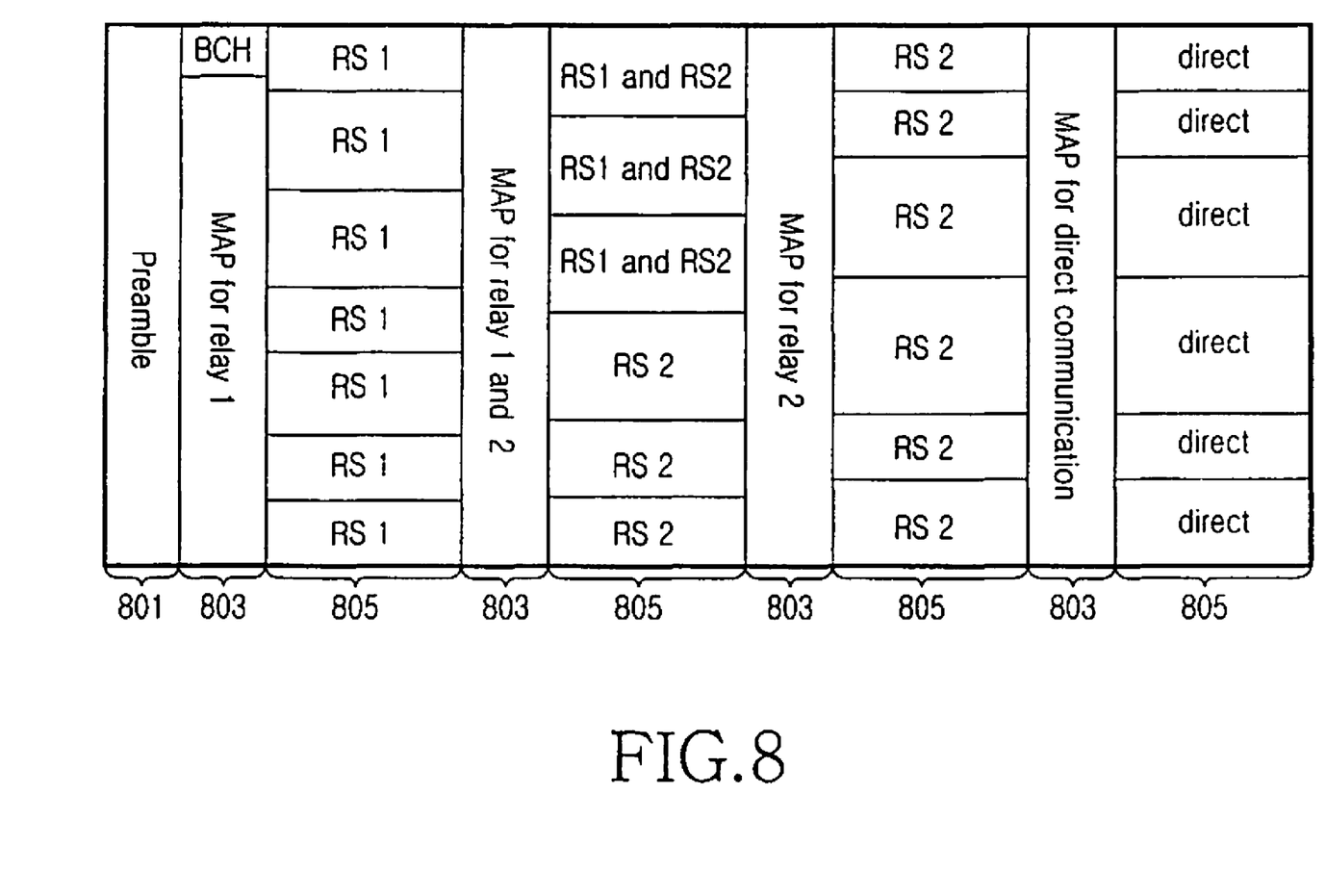
FIG. 8 illustrates another frame structure defined to implement the resource allocation information transmission scheme illustrated in FIG. 4.

FIG. 8 illustrates another frame structure defined to implement the resource allocation information transmission scheme according to the second embodiment of the present invention.

In FIG. 8, like the frame illustrated in FIG. 7, a frame includes a preamble area 801, resource allocation information areas 803, and data burst areas 805. A resource allocation information area 803 has control information in an BCH, which indicates the positions, channel coding rates, and modulation schemes of resource allocation information set for the RSs that will relay signals. As noted from FIG. 8, a resource allocation information area and a data burst area are positioned alongside for each RS to relay signals.

If RS 1 is to relay signals between the BS 400 and the MS 406, RS 1 detects the position of resource allocation information allocated to RS 1 from the Broadcast Channel (BCH), decodes the resource allocation information, and acquires a data burst indicated by the decoded resource allocation information.

If RS 2 is to relay signals between the BS 400 and the MS 406, RS 2 detects the position of resource allocation information allocated to RS 2 from the BCH, decodes the resource allocation information, and acquires a data burst indicated by the decoded resource allocation information.

The frame configuration illustrated in FIG. 8 is characterized in that the frame can be partially transmitted/received because a resource allocation information area and a data burst area are positioned together on an RS basis. Therefore, an RS can transmit only resource allocation information and a data burst allocated to the RS to an MS by turning on during the period of a resource allocation information area with the resource allocation information and a data burst area with the data burst. As the RS can transition to sleep mode in the remaining period, power is advantageously saved.

In the case where RS 1 and RS 2 relay signals between the BS 400 and the MS 406 at the same time, RS 1 and RS 2 also decode only resource allocation information allocated to them and only data bursts indicated by the decoded resource allocation information. Decoding of the resource allocation information and the data bursts has been described above and thus its description is not provided herein.

In the case where the BS 400 communicates directly with the MS 406, the BS 400 includes information indicating direct signal transmission to the MS 406 in the BCH. As RS 1 and RS 2 decode the BCH and recognize a resource allocation information area and a data burst area set for the direct signal transmission, the BS 400 and the MS 406 directly communicate with each other.

In accordance with the second exemplary embodiment of the present invention as described above, RS 1 and RS 2 acquire information about the positions of resource allocation information set for the RSs that will relay signals between the BS and MSs in an BCH based on a resource allocation information message received from the BS. Thus, an RS selected to relay signals between the BS 400 and the MS 406 decodes only resource allocation information intended for the RS, detects the position of a data burst to be relayed from the decoded resource allocation information, decodes the data burst, and then transmits the data burst to the MS 406. Therefore, computation volume is minimized.

As the RS has to acquire only the resource allocation information intended for the RS, the size of the resource allocation information message is reduced. Since the RS decodes only the data burst to be relayed, computation volume and transmission delay are minimized. A different MCS is used for resource allocation information allocated to each RS, thereby further saving resources in transmitting the entire resource allocation information.

As is apparent from the above description, the present invention advantageously reduces the size of a resource allocation information message and computation volume and minimizes transmission delay by proposing a method for transmitting resource allocation information through an RS in a communication system. Since the RS relays only resource allocation information and data allocated to RS, power is saved and neighbor cell interference is further reduced.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting and receiving resource allocation information in a Relay Station (RS) in a communication system, comprising:
   receiving a resource allocation information message from a Base Station (BS);
   detecting a first resource allocation information from the resource allocation information message; and
   detecting a second resource allocation information intended only for the RS using the first resource allocation information,
   wherein the first resource allocation information includes information about positions, channel coding rates, and modulation schemes of resource allocation information intended for RSs to relay signals between the BS and Mobile Stations (MSs).

2. The method of claim 1, wherein the first resource allocation information is carried in a Broadcast Channel (BCH) of a downlink data frame.

3. The method of claim 1, wherein the second resource allocation information includes information about a position and size of a data burst that the RS will relay.

4. The method of claim 1, further comprising transmitting the second resource allocation information to an MS.

5. The method of claim 1, wherein the second resource allocation information is modulated, encoded and power controlled in a modulation, coding scheme and transmit power adapted according to channel status of the RS.

6. A method for transmitting resource allocation information in a Base Station (BS) in a communication system, comprising:
   selecting a Relay Station (RS) for relaying a signal between the BS and a Mobile Station (MS) and generating a first resource allocation information including information about a position, a channel coding rate, and a modulation scheme of resource allocation information intended for the selected RS;
   generating a second resource allocation information including information about a position and size of a data burst to be relayed by the selected RS;
   generating a resource allocation information message including the first and second resource allocation information; and
   transmitting the resource allocation information message to the selected RS.

7. The method of claim 6, wherein the first resource allocation information is carried in a Broadcast Channel (BCH) of a downlink data frame.

8. The method of claim 6, wherein the second resource allocation information is modulated, encoded and power controlled in a modulation, coding scheme and transmit power adapted according to channel status of the selected RS.

9. A system for transmitting and receiving resource allocation information in a communication system, comprising:
   a Mobile Station (MS); and
   a Relay Station (RS) for relaying a signal between the MS and a Base Station (BS),
   wherein the RS receives a resource allocation information message from the BS, detects a first resource allocation information from the resource allocation information message, and detects a second resource allocation information intended only for the RS using the first resource allocation information,
   wherein the first resource allocation information includes information about a position, channel coding rate, and modulation scheme of resource allocation information intended for the RS.

10. The system of claim 9, wherein the first resource allocation information is carried in a Broadcast Channel (BCH) of a downlink data frame.

11. The system of claim 9, wherein the second resource allocation information includes information about a position and size of a data burst that the RS will relay.

12. The system of claim 9, wherein the RS transmits the second resource allocation information to the MS.

13. The system of claim 9, wherein the second resource allocation information is modulated, encoded and power controlled in a modulation, coding scheme and transmit power adapted according to channel status of the RS.

14. A system for transmitting and receiving resource allocation information in a communication system, comprising:
   a Mobile Station (MS); and
   a Relay Station (RS) for relaying a signal between the MS and a Base Station (BS),
   wherein the BS selects the RS for relaying a signal between the BS and the MS, generates a first resource allocation information including information about a position, a channel coding rate, and a modulation scheme of resource allocation information intended for the selected RS, generates a second resource allocation information including information about a position and size of a data burst to be relayed by the selected RS, generates a resource allocation information message including the first and second resource allocation information, and transmits the resource allocation information message to the selected RS.

15. The system of claim 14, wherein the first resource allocation information is carried in a Broadcast Channel (BCH) of a downlink frame.

16. The system of claim 14, wherein the second resource allocation information is modulated, encoded and power controlled in a modulation, coding scheme and transmit power adapted according to channel status of the RS.

17. A method for transmitting and receiving resource allocation information in a Relay Station (RS) in a communication system, comprising:
   receiving a downlink data frame from a Base Station (BS), the downlink data frame including information about a second area in a first area;
   decoding the second area using the second area information;
   detecting a third area including a data burst to be relayed by the RS according to the decoded second area;
   detecting the data burst by decoding the third area; and
   encoding information acquired by decoding the first, second and third areas and the detected data burst and relaying the encoded information and data burst to a Mobile Station (MS).

18. The method of claim 17, wherein the first area is a Broadcast Channel (BCH) in the downlink data frame.

19. The method of claim 17, wherein the second area information is MAP information transmitted in a DownLink-MAP (DL-MAP) including broadcasting information and control information for decoding data bursts.

20. A method for transmitting and receiving resource allocation information in a Relay Station (RS) in a communication system, comprising:
   receiving a resource allocation information message from a Base Station (BS);

acquiring RS information about the RS to relay a signal between the BS and a Mobile Station (MS) and information about a data burst to be relayed by the RS by decoding the resource allocation information message;

encoding the resource allocation information message and transmitting the encoded resource allocation information message to the MS, wherein the RS information includes information about a position, a channel coding rate, and a modulation scheme of resource allocation information intended for the RS.

21. The method of claim 20, further comprising decoding the data burst using the RS information.

22. The method of claim 20, wherein the resource allocation information message includes the RS information and the data burst information.

23. A method for transmitting resource allocation information in a Base Station (BS) in a communication system, comprising:

selecting a Relay Station (RS) to relay a signal between the BS and a Mobile Station (MS) and generating RS information for the selected RS;

generating a resource allocation information message including the RS information and information about a data burst to be relayed by the RS; and transmitting the resource allocation information message to the RS, wherein the RS information includes information about a position, a channel coding rate, and a modulation scheme of resource allocation information intended for the RS.

24. A system for transmitting and receiving resource allocation information in a communication system, comprising:

a Mobile Station (MS); and a Relay Station (RS) for relaying a signal between a Base Station (BS) and the MS, wherein the RS receives a resource allocation information message from the BS, acquires RS information about the RS to relay a signal between the BS and the MS and information about a data burst to be relayed by decoding the resource allocation information message, encodes the resource allocation information message, and transmits the encoded resource allocation information message to the MS, and wherein the RS information includes information about a position, a channel coding rate, and a modulation scheme of resource allocation information intended for the RS.

25. The system of claim 24, wherein the RS decodes the data burst using the RS information.

26. The system of claim 24, wherein the resource allocation information message includes the RS information and the data burst information.

27. A system for transmitting and receiving resource allocation information in a communication system, comprising:

a Mobile Station (MS); and a Relay Station (RS) for relaying a signal between a Base Station (BS) and the MS, wherein the BS selects the RS for relaying a signal between the BS and the MS, generates an RS information for the selected RS, generates a resource allocation information message including the RS information and information about a data burst to be relayed by the RS, and transmits the resource allocation information message to the RS, and wherein the RS information includes information about a position, a channel coding rate, and a modulation scheme of resource allocation information intended for the RS.

* * * * *